United States Patent
Bolt

[11] Patent Number: 5,360,501
[45] Date of Patent: Nov. 1, 1994

[54] HOLOGRAPHIC TRANSFER LAMINATION MATERIALS AND PROCESS

[75] Inventor: L. Gordon Bolt, Playa del Rey, Calif.

[73] Assignee: Hughes Aircraft Company, Los Angeles, Calif.

[21] Appl. No.: 46,463

[22] Filed: Apr. 7, 1993

Related U.S. Application Data

[63] Continuation of Ser. No. 961,042, Oct. 14, 1992, abandoned, which is a continuation of Ser. No. 626,804, Dec. 13, 1990, abandoned.

[51] Int. Cl.⁵ .............................................. B32B 31/00
[52] U.S. Cl. ..................................... 156/101; 156/106; 156/235; 156/240; 156/241; 156/249; 156/275.5; 156/334
[58] Field of Search ............ 430/1, 2; 156/289, 272.2, 156/275.5, 106, 99, 101, 230, 235, 240, 241, 249, 309.6, 324.4, 247, 334

[56] References Cited

U.S. PATENT DOCUMENTS

| | | | |
|---|---|---|---|
| 3,208,902 | 9/1965 | Arond et al. | 156/99 X |
| 3,967,021 | 6/1976 | Weingrad | 156/230 X |
| 4,249,958 | 2/1981 | Baudin et al. | 156/107 |
| 4,367,108 | 1/1983 | Valimont | 156/106 X |
| 4,597,815 | 7/1986 | Nakamura | 156/235 |
| 4,717,739 | 1/1988 | Chevreux et al. | 156/99 X |
| 4,721,648 | 1/1988 | Kleine-Doepke | 156/99 X |
| 4,840,757 | 6/1989 | Blenkhorn | 156/289 X |
| 4,842,389 | 6/1989 | Wood et al. | 156/99 X |
| 4,856,857 | 8/1989 | Takeuchi et al. | 350/3.6 |
| 4,908,285 | 3/1990 | Kushibiki et al. | 430/1 |
| 4,963,471 | 10/1990 | Trout et al. | 430/1 |
| 4,976,799 | 12/1990 | Wood | 156/106 |
| 4,978,593 | 12/1990 | Yin et al. | 430/1 |
| 5,066,525 | 11/1991 | Nakamachi et al. | 156/99 X |

Primary Examiner—Chester T. Barry
Attorney, Agent, or Firm—Leonard A. Alkov; W. K. Denson-Low

[57] ABSTRACT

Disclosed is a process for configuring a hologram (30) onto a final laminate (38) incorporating the hologram (30), including a car windshield or an aircraft canopy. The process includes first developing the hologram (30) on a process substrate (22). Intermediate the hologram (30) and the process substrate (22) is a thermoplastic layer (24). After the hologram (30) has been developed, the hologram laminate (20) including the process substrate (22), thermoplastic layer (24), and hologram (30) is applied to a first final laminate layer (34) by means of an adhesive (32) such that the hologram (30) is facing the first final laminate layer (34). Once this step is completed heat is applied to the hologram laminate (20) to melt the thermoplastic layer (24), thus removing the process substrate (22). Therefore, a second final laminate layer (40) can be applied to the opposite side of the hologram (30) without any drawbacks from the thickness of any additional support layers in the final laminate (38).

5 Claims, 1 Drawing Sheet

HOLOGRAPHIC TRANSFER LAMINATION MATERIALS AND PROCESS

This is a continuation of application Ser. No. 07/961,042, filed Oct. 14, 1992, now abandoned, which is a continuation of application Ser. No. 07/626,804, filed Dec. 13, 1990, now abandoned.

BACKGROUND OF THE INVENTION

1. Technical Field

This invention relates generally to a process for laminating a hologram to a substrate, and more specifically, to a process for laminating a hologram between two final product substrates without any other interfering support layers.

2. Discussion

The art of holography has come a long way since its early inception as a means to create a three-dimensional image. Today, the use of holograms has a wide range of commercial, as well as technologically advanced applications. One such application of a hologram is laminating the hologram between two layers of windshield glass to create a heads-up display for use in a vehicle, such as an automobile or aircraft. What this means is that a hologram carrying information of vehicle operation can be laminated within the windshield of the vehicle to enable the vehicle operator to receive the information and still maintain visual contact with his surroundings. Since the incorporation of a hologram in such a final laminated configuration generally includes not only the hologram itself, but a support substrate or backing layer on which the hologram was developed, the increased thickness due to these layers of the final laminate thickness offers certain drawbacks in the prior art.

To laminate the hologram and backing or support layer, the prior art hologram processing techniques generally includes the body of bonding technology which has applications to optical process technologies. The most relevant prior art is a technique employing a thin sheet of glass as an interlayer between a process substrate and a hologram, as shown generally in FIG. 1. In FIG. 1A, shown at 10 is an end view of a prior art laminated hologram after the hologram generating process has been completed. Laminate 10 includes a process substrate layer 12 generally of a glass material and having a thickness of about 0.125" (approximately 450 microns). Substrate layer 12 acts as a support layer on which a hologram 18 is developed by means well known to those skilled in the art. Hologram 18 will be approximately 25 microns thick. Adhered to substrate layer 12 is a microsheet 16 by means of an adhesive layer 14. Microsheet 16 is generally a glass having a thickness of approximately 75 microns. Adhesive 14 can be any known optical glue. Hologram 18 is developed on microsheet 16 opposite substrate 12 from a gelatin or photoemulsion layer.

After completion of the holographic process, hologram 18 and microsheet 16 are removed from the process substrate 12 by dissolving adhesive layer 14 or by peeling, each well known to those skilled in the art. The hologram 18 and microsheet 16 are then sandwiched between two final laminate substrates 11 and 13, such as a dual windshield glass configuration of an automobile, in their final product, as shown in FIG. 1B. Adhesive layers 15 and 17 provide the means by which the hologram/microsheet laminate is adhered to the windshield layers 11 and 13.

Because the final laminate includes the relatively thick microsheet (75 microns), the final thickness of the windshield is unnecessarily increased thus producing certain windshield deformations, and further, increasing optical distortion. Another problem arising is the extra handling required for removing the fragile hologram/microsheet laminate from the process substrate. This handling produces incidental optical defects, such as scratches, wrinkles, and particulate contamination. And finally, the hologram/microsheet is very flexible after it has been removed from the process substrate requiring high skill, and thus, the ability to efficiently and accurately transfer the hologram from the process substrate to the final laminate is difficult. These problems typically result in thickness gradients in the lamination, which produces optical distortion.

What is needed then is a hologram developing and lamination process which eliminates the need for the extra thickness of the prior art microsheet, and substantially eliminates the extra dexterity and handling required to position the thin hologram in its final lamination state.

SUMMARY OF THE INVENTION

Disclosed is a hologram processing technique which includes processing the hologram on the traditional process substrate, but further, includes a heat sensitive thermoplastic layer between the hologram and the process substrate instead of a microsheet support layer of the prior art. Once the holographic process is completed, the hologram process laminate, including the process substrate, can first be adhered to one sheet of a final laminate such as a windshield. Heat is then applied to the process laminate such that the thermoplastic layer is melted and the process substrate is removed. Therefore, a second sheet of the final laminate can be applied to the opposite side of the hologram without any other interfering layers. By this process the hologram need not be removed from the relatively thick process substrate prior to applying it to the final laminate, and thus the drawbacks of handling a flexible hologram laminate are substantially eliminated. In addition, the extra thickness of the microsheet of the prior art is not incorporated into the final product laminate by the elimination of the microsheet through use of the thermoplastic layer. This method therefore results in constructions with minimal thickness gradients, minimal overall thickness, and few of the defects typically associated with handling and laminating thin flexible holographic films.

This invention has application in certain heads up display optical elements for auto and aircraft, in particular those which are integral with a windshield or canopy. These applications would provide space efficient display formats which in the case of autos could eliminate the need for dashboard displays all together. In the case of aircraft, dedicated stand-alone heads up display assemblies, which are now placed between the pilot and canopy, could possibly be eliminated.

Additional objects, advantages and features of the present invention will become apparent from the following description and appended claims, taken in conjunction with the accompanying drawings.

DETAILED DESCRIPTION OF THE PREFERRED EMBODIMENT

The following description of the preferred embodiment is merely exemplary in nature and is in no way intended to limit the invention or its application or uses.

Figure 1A:
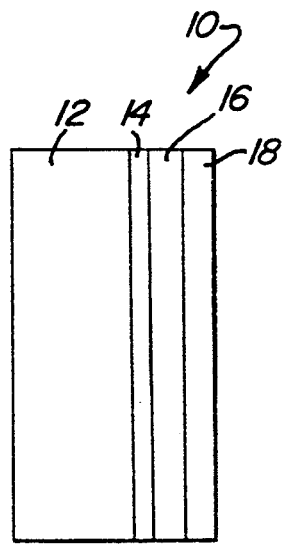
FIGS. 1A-B are end views of a prior art hologram processing laminate.
Figure 1B:
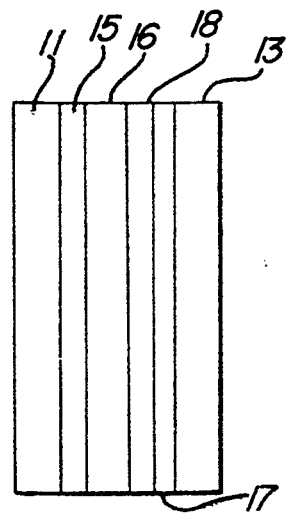
Figures 2A, 2B:
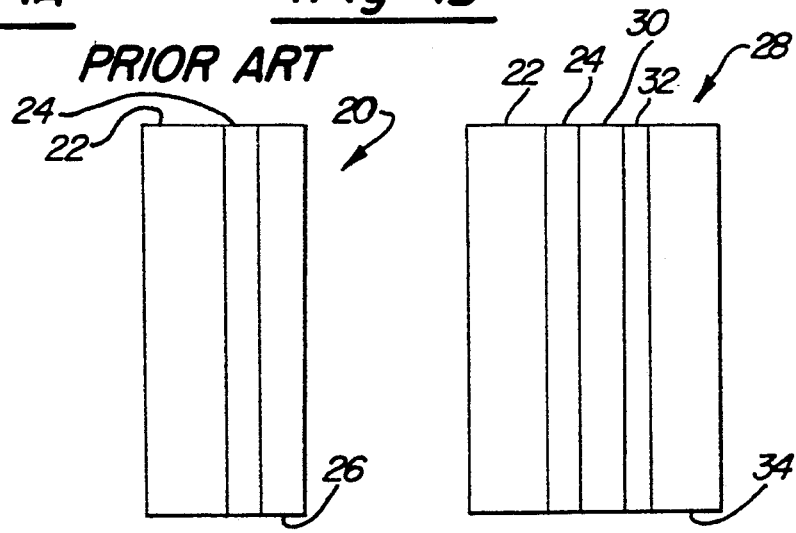
FIGS. 2A-D are end views of a hologram processing laminate according to a preferred embodiment of the invention.

FIG. 2 shows a process for transferring a hologram processing laminate to a final product laminate, such as a windshield of a vehicle. First turning to FIG. 2A, an end view of a laminate structure 20 is shown having a process substrate layer 22, a thermoplastic adhesive layer 24, and a gelatin or photoemulsion layer 26. Substrate layer 22 is generally a glass and has a thickness of approximately 0.125" (approximately 450 microns). Gelatin layer 26 is any known photosensitive gelatin, and generally has a thickness of approximately 25 microns. Thermoplastic adhesive layer 24 is any thermoplastic adhesive which offers appropriate bonding between the substrate glass layer 22 and the photographic gelatin layer 26, and which does not chemically interact with the gelatin layer 26.

FIG. 2B shows a laminate structure 28 having substrate layer 22 and thermoplastic layer 24 as in FIG. 2A. Adhered to thermoplastic layer 24 is a hologram 30 developed from gelatin layer 26 by a hologram processing technique well known to those skilled in the art. Opposite thermoplastic adhesive layer 24 from hologram 30 is an adhesive layer 32. Adhesive layer 32 can be any epoxy or ultraviolet (UV) curable composition with appropriate optical and adhesive qualities. Adhesive layer 32 generally has a thickness of about five microns. Opposite hologram 30 from adhesive layer 32 is a first product layer 34, such as a windshield.

Figure 2C:
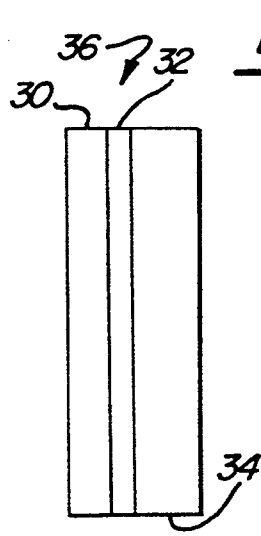

FIG. 2C shows a laminate structure 36 identical to the laminate structure 28 of FIG. 2B, but in which the process substrate layer 22 and thermoplastic adhesive layer 24 have been removed. Therefore, hologram 30 is exposed on one side and is adhered to the first product layer 34 by the adhesive layer 32 on the opposite side.

Figure 2D:
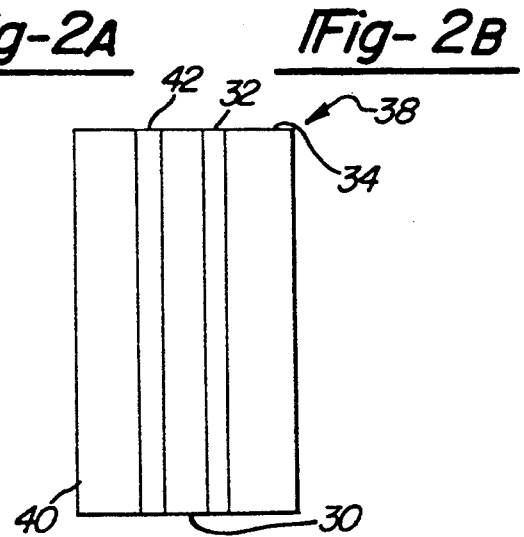

FIG. 2D shows a laminate structure 38 in which the laminate structure 36 from FIG. 2C, including the hologram 30, the adhesive layer 32 and the first product layer 34, have been adhered to a second product layer 40 by means of a second adhesive layer 42. Adhesive layer 42 can be any appropriate optical quality adhesive, and is generally a PVB adhesive. Therefore, hologram 30 is sandwiched between two windshield layers 34 and 40 by means of two adhesive layers 32 and 42.

Hologram 30 is developed on process substrate 22 by well known means. Simplistically, photosensitive gelatin 26 is impinged with two coherent beams of light to create an interference pattern to form the desirable hologram 30. Instead of using the prior art microsheet to give the relatively thin hologram 30 support when transferring the process laminate structure shown by FIG. 2A to the final laminate structure shown by FIG. 2D, thermoplastic layer 24 is incorporated to enable the process substrate layer 22 to be the support layer. This is achieved by transferring the entire laminate structure 20 from the hologram development stage of FIG. 2A to a first adhesion stage of the final laminate represented by laminate structure 28 of FIG. 2B. As is apparent from this figure and the discussion above, the entire laminate structure 20 is applied to product layer 34 by means of adhesive layer 32. To facilitate removal of the process substrate layer 22, adequate heat is applied to the entire laminate 28 such that thermoplastic layer 24 is melted, thus enabling process substrate layer 22 to be removed without adversely affecting the other layers, especially the hologram 10.

After the heating process is complete the entire thermoplastic layer 24 and process substrate 22 have been removed as is apparent by the laminate structure 36 of FIG. 2C. At this intermediate stage, the hologram 30 is supported by product layer 34. To finish the final laminate structure 38 as shown in FIG. 2D, an adhesive layer 42 is adhered to the side of hologram 30 which was previously adhered to thermoplastic layer 24. Adhesive layer 42 provides a means by which a second product layer 40 can be adhered to hologram 30. Therefore, the final laminate structure 38 only includes a minimal thickness between the two windshield layers 34 and 40, to provide adequate space for just the hologram 30. This thickness is about 25 microns (hologram alone), as opposed to 100 microns (hologram and microsheet) of the prior art. By this, optical distortion, and other thickness drawbacks are minimized or eliminated. It will be understood that the embodiment of FIG. 2 merely describes one use of the process described above, and as such, hologram 30 could be adhered to other substrates, including single layer substrates, in a final form by means of thermoplastic layer 24 as described above.

Thermoplastic adhesive layer 24 is applied to the process substrate 22 before the gelatin coating layer 26 is applied. Thermoplastic layer 24 is generally applied to substrate 22 by means of spin coating well known to those in the art. However, other methods of applying thermoplastic layer 24 to the substrate adaptable to a roll-to-roll process are applicable. Thermoplastic layer 24 should have sufficient adhesion to adhere the gelatin layer 26 to the process substrate 22, and also withstand the dimensional stresses of the holographic process. Thermoplastic layer 24 should further be removable from hologram 30 with only moderate heat so as to not adversely effect the hologram image. In addition, thermoplastic layer 24 must be compatible with the holographic process, i.e., it must not interfere with the development of the holographic image formed in the gelatin layer 26. In practice, thermoplastic adhesive layer 24 has been a polyamide thermoplastic, however, other thermoplastics with suitable optical quality can be used for other process variances.

Once laminate structure 20 is formed, and hologram 30 has been developed from the gelatin layer 26, the laminate structure is then applied to product layer 34 as shown in FIG. 2B. Lamination of structure 20 to layer 34 generally utilizes vacuum processes and requires either an epoxy adhesive or a UV curable composition as layer 32. An epoxy is generally used for holograms having less than 10 square inches. Larger formats require larger vacuum pull down times, and as such generally require a UV curable material.

A new epoxy resin has been developed to provide the necessary adhesion of the hologram 30 to a typical product layer 34, and further, stand up to the delamination process of applying heat to remove the process substrate layer 22 by melting thermoplastic layer 24. This epoxy generally has a 65 WT % acrylated epoxy resin; 31 WT % acrylated epoxy monomer; and 4 WT% benzophenone. Using this epoxy as adhesive layer 32 requires preparation of the surface of product layer 34 with an acrylated silane functional monomer, followed by water condensation and heat typically at 100 degrees celsius.

Once the hologram is adhered to the first product layer 34 by means of adhesive layer 32, and the process substrate layer 22 has been removed by heating the thermoplastic layer 24, one side of the hologram is exposed as shown in FIG. 2C. This side is then prepared for the adhesion of the second product layer 40. Generally, adhesive layer 42 is a polyvinyl butyryl (PVB) to provide adequate adhesion of the second product layer 40 to hologram 30 and still maintain high optical qualities. To reduce or remove the sensitivity of hologram 30 to moisture from the PVB layer 42, the PVB layer 42 is applied to hologram 30 by vacuum degassing at a temperature of approximately 60° C. for approximately 12 hours. During subsequent PVB lamination, this insert is inlaid into the PVB layer over the holograms, and during autoclave processes readheres itself to the PVB sheet with no visible defect apparent to the unaided eye.

The above-described process produces hologram laminates that are very flat. For certain applications, bond line thickness gradients of less than 8 microns over 0.3 square feet can be achieved. In addition, minimal edge lensing occurs due to minimal construction thickness. Optical quality can further be enhanced by utilizing a polished borosylicate glass as the substrate layer 22. By this, Lipman mirror and slant fringe representational holograms have been produced with no apparent ghosting, multiple reflections, spurious scattering, haze, or loss of resolution. Minimization of discoloring can be achieved by using an UV curable adhesive for adhesive layer 32. Further, hologram discoloration after processing can be regulated by proper glass substrate controls, and can be minimized by increased triethanolamine (TEA) immersion times and by increasing the fixer dwell time. In addition, mean diffraction efficiencies trend higher than glass substrate controls, and thus diffraction characteristics are red-shifted.

The thermoplastic interlayer must have sufficient adhesion to gelatin and glass to withstand the dimensional stresses of the holographic process, and be removable from the hologram with only moderate heat. The thermoplastic interlay is compatible with process temperatures of 20° C. As the temperature increases certain deformations may occur such as reticulation of the adhesive due to swelling and subsequent shrinkage. Such deformations may effect the holographic performance. An example of holographic performance through post processing thermal and lamination cycles is shown in Table III for spin coated layers with an initial transmission of 76% at 0.514 microns (514 nm).

TABLE III

Holographic Performance During Post Processing Cycles

| Conditioning | Diff. Eff. +3% | λ, ±5 nm |
|---|---|---|
| (1) Hot Process, 48 hrs. Nit. | 87 | 542 |
| (2) 10' at 80 C/Nit. | 79 | 522 |
| (3) 2 hrs 60 C/Vac. | 80 | 525 |
| (4) After transfer delamntn. | 85 | 515 |
| (5) PVB lamination, 150 psi, 120 C. | 73 | 478 |

The performance statistics of Table III are for a hot process for preparing the laminate structure after the hologram has been developed. Step (1) involves drying the hologram laminate in a nitrogen atmosphere for approximately 48 hrs. This gives the hologram a diffraction efficiency (Diff. Eff.) of about 87% at the wavelength of 542 nm. This means that the hologram reflects about 87% of the light incident upon it at a wavelength of 542 nm. The diffraction efficiency is a measure of the ability of a viewer to perceive the hologram. Step (2) involves heating the laminate to 80° C. in a nitrogen atmosphere for 10 minutes. In Step (3), the laminate is then heated in a vacuum for approximately 2 hours at 60° C. After Step (3) the hologram is delaminated from the thermoplastic layer. The diffraction efficiency at the peak reflected wavelength are also given for steps (2), (3) and (4). Step (5) involves applying the PVB adhesive at 150 psi and 120° C. As can be seen, the diffraction efficiency and reflected wavelength are reduced.

Disclosed is a novel method and apparatus for transferring a hologram to a final hologram laminate to eliminate or substantially reduce many of the distortions which have been a problem due to the thickness of the prior art hologram laminate structure. This disclosure describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A process of laminating a hologram to a final laminate comprising the steps of:
   providing a photosensitive gelatin layer in contact with a thermoplastic layer and providing said thermoplastic layer in contact with a process substrate layer opposite to the gelatin layer to form a hologram laminate;
   developing a predetermined hologram image in the photosensitive gelatin layer to form a hologram layer;
   adhering the hologram laminate to a first final substrate by an epoxy optical adhesive, wherein the hologram layer is in contact with the first final substrate, said first final substrate being transparent to light;
   applying heat to the hologram laminate in order to melt the thermoplastic layer and remove the process substrate layer from the hologram layer;
   adhering a second final substate to the hologram layer opposite to the first final substrate by an epoxy optical adhesive, said second final substrate also being transparent to light, wherein the hologram layer is the sole layer between the optical adhesives which adhere the hologram layer to the first and second final substrates; and
   wherein said epoxy optical adhesive includes an approximate mixture of 65 WT % acrylated epoxy resin, 31 WT % acrylated epoxy monomer and 4 WT % benzophenone.

2. The process according to claim 1 wherein the step of adhering the hologram laminate to a first final substrate includes adhering to a car windshield.

3. The process according to claim 1 wherein the step of adhering the hologram laminate to the first final substrate includes adhering the hologram laminate to an aircraft canopy.

4. The process according to claim 1 further comprising the steps of adhering the hologram laminate to the final substrates by a vacuum process.

5. The process of laminating a hologram according to claim 1 wherein said hologram layer is about 25 microns in thickness.

* * * * *